United States Patent
Oka et al.

(10) Patent No.: US 6,782,771 B2
(45) Date of Patent: Aug. 31, 2004

(54) JOINT AND A STEERING ASSIST SYSTEM USING THE SAME

(75) Inventors: Kunihiro Oka, Kashihara (JP); Osamu Sano, Kashihara (JP); Takeo Iino, Kashiwara (JP); Masanori Kobayashi, Nara (JP); Shigetaka Kinme, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 38 days.

(21) Appl. No.: 10/050,143

(22) Filed: Jan. 18, 2002

(65) Prior Publication Data

US 2002/0096005 A1 Jul. 25, 2002

(30) Foreign Application Priority Data

Jan. 19, 2001 (JP) ........................................ 2001-012247
Mar. 13, 2001 (JP) ........................................ 2001-070776

(51) Int. Cl.[7] .............................................. F16H 35/00
(52) U.S. Cl. ...................... 74/388 PS; 180/444; 464/47
(58) Field of Search ............................. 74/388 PS, 409, 74/425, 458, 498, 500; 464/9, 32, 47, 61, 87, 89, 92; 180/443, 444

(56) References Cited

U.S. PATENT DOCUMENTS 2,478,979 A * 8/1949 Portmann ...................... 464/9
2,586,293 A * 2/1952 Birkigt ......................... 74/425
4,327,562 A * 5/1982 Gottschalk ................... 464/89
5,482,127 A * 1/1996 Eda et al. ................ 74/388 PS
5,871,064 A * 2/1999 Suzuki et al. ............... 180/444
6,223,615 B1 * 5/2001 Huck ........................... 74/425

FOREIGN PATENT DOCUMENTS

JP 2000-043739 2/2000

* cited by examiner

*Primary Examiner*—Thomas Williams
(74) *Attorney, Agent, or Firm*—Smith, Gambrell & Russell, LLP (57) ABSTRACT

A steering assist system which transmits the rotation of an electric motor to a steering shaft via a worm shaft and a worm wheel meshed with a worm of the worm shaft, where an output shaft of the electric motor and the worm shaft are interconnected via a joint. The joint includes a cylindrical first transmission member mounted on the output shaft, a cylindrical second transmission member to which the worm shaft is mounted, and a cylindrical elastic body interposed between the first and second transmission members. The joint may further include a torque limiter including a spring which is interposed between an end surface of the second transmission member and a spring seat formed at an end surface of a third transmission member in opposed relation with the end surface of the second transmission member for inhibiting relative rotation between the second and third transmission members.

6 Claims, 8 Drawing Sheets

JOINT AND A STEERING ASSIST SYSTEM USING THE SAME

BACKGROUND OF THE INVENTION

The present invention relates to a joint for interconnecting an output shaft of an electric motor and a rotating shaft, and to a steering assist system using the same.

Figure 8:
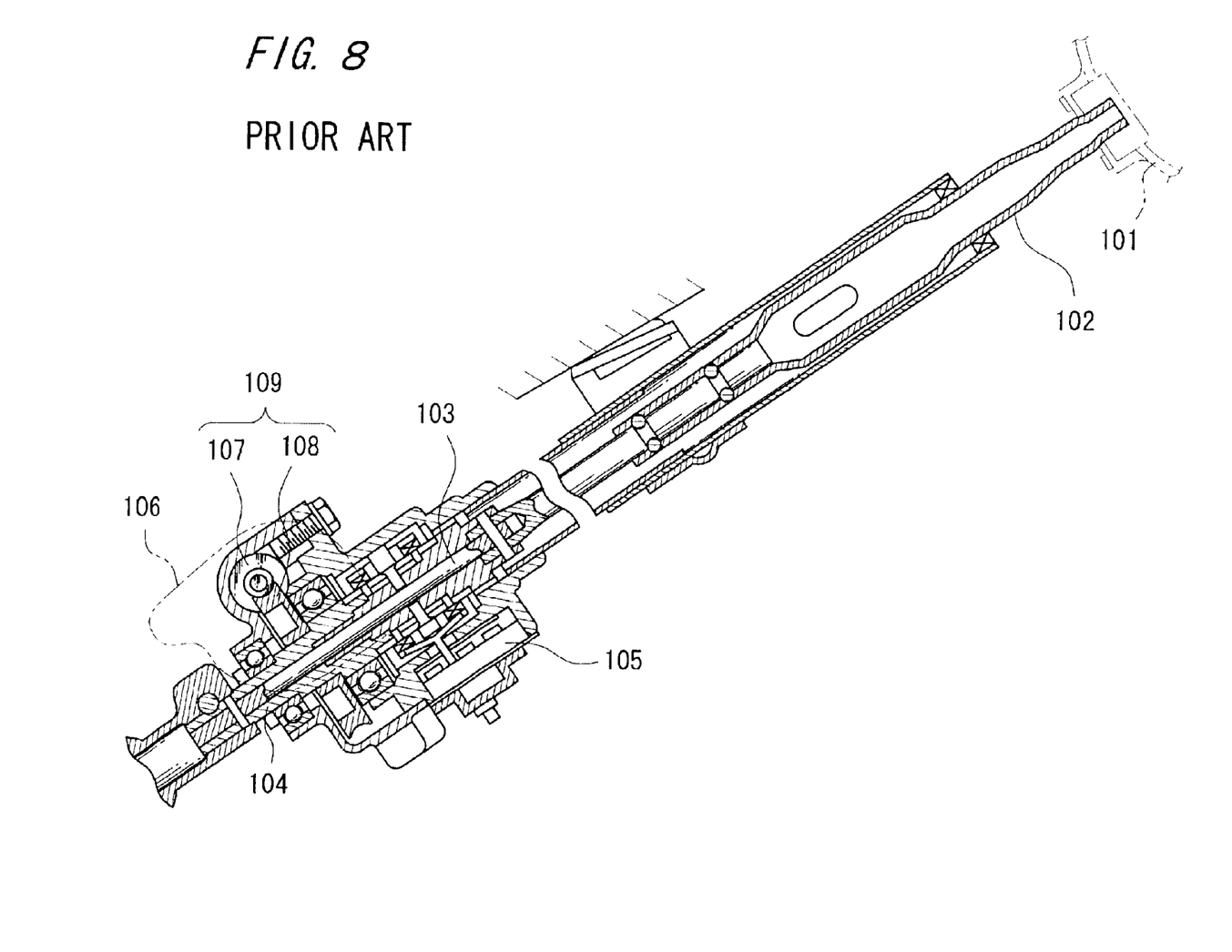
FIG. 8 is a sectional view showing an example of the conventional steering assist system.

Heretofore, there have been proposed devices as automotive steering assist system which provides an auxiliary force to manual steering force by way of an electric motor. FIG. 8 illustrates an example of a steering assist system of this type, which is arranged as follows. A first steering shaft 102 with a steering wheel (handle) 101 attached thereto is connected in series with a second steering shaft 104 disposed therebelow via a torsion bar 103. A torque sensor 105 detects a steering torque based on a quantity of relative rotational displacement between the first steering shaft 102 and the second steering shaft 104. On the other hand, an electric assist motor 106 is driven based on the detection result while the rotation of the electric motor 106 is transmitted to the second steering shaft 104 as reduced by a deceleration mechanism 109 whereby the auxiliary force is added to the manual steering force applied by means of the steering wheel 101.

The deceleration mechanism 109 consists of a worm shaft 107 formed with a worm, and a synthetic-resin worm wheel 108 integrally rotatably mounted to the second steering shaft 104 as meshed with the worm. The worm shaft 107 is integrally rotatably connected with an output shaft of the electric motor 106 via a joint. The worm shaft 107 and the second steering shaft 104 are each supported by bearings at opposite ends thereof, so as to be prohibited from moving radially or longitudinally.

The prior-art steering assist system has the following problem. If backlash occurs at a meshing engagement area between the worm of the worm shaft 107 and the worm wheel 108, the backlash causes so-called rattling noises, which may be conveyed to a passenger compartment to annoy a vehicle operator or passenger. Therefore, it is a general practice in the fabrication of the system to combine the worm shaft 107 and worm wheel 108 of suitably selected sizes such that the backlash may be avoided. However, it is quite difficult to avoid the occurrence of backlash no matter how the adjustment is made in the fabrication of the system as a countermeasure against the backlash, because the teeth of the worm shaft 107 and worm wheel 108 are worn through the operations of the steering assist system. There is another fear that the synthetic-resin worm wheel 108 may expand due to water absorption, heat or the like resulting in the increase of rotational torque (rotational resistance).

In this connection, there is proposed a steering assist system arranged such that the worm shaft 107 is supported in a manner to be biased toward the worm wheel 108 and is spring biased toward the worm wheel thereby preventing the occurrence of backlash or the increase of the rotational torque (see, for example, Japanese Unexamined Patent Publication No.2000-43739).

However, this steering assist system must allow for the eccentricity and inclination of the worm shaft 107 relative to the output shaft of the electric motor 106. Accordingly, an elongate joint such as a universal joint is required for interconnecting these shafts. Thus, the system requires a larger space for the interconnection of the shafts, resulting in the increase of size and costs.

Furthermore, the worm shaft 107 is prone to vibrate during the rotation of the electric motor 106. This leads to a fear that the vibration is transmitted to the steering wheel 101 which, in turn, may provide an impaired steering feeling.

In the event of a failure of the electric motor 106 which involves an abnormal increase of the rotational resistance of the output shaft thereof, there will be required a significant increase of steering effort on the steering wheel.

OBJECT OF THE INVENTION

It is an object of the invention to provide a joint which provides a compact, low-cost connection between the output shaft of the electric motor and the rotating shaft driven into rotation by the output shaft and which is capable of damping the vibration of the rotating shaft.

It is another object of the invention to provide a joint adapted to permit relative rotation between the output shaft and the rotating shaft when the rotational resistance of the output shaft or rotating shaft is increased abnormally.

It is still another object of the invention to provide a steering assist system which provides a compact, low-cost connection between the output shaft of the electric motor and the rotating shaft driven into rotation by the output shaft and which is capable of damping the vibration of the worm shaft.

It is yet another object of the invention to provide a steering assist system adapted to permit relative rotation between the output shaft and the rotating shaft when the rotational resistance of the output shaft or rotating shaft is increased abnormally.

SUMMARY OF THE INVENTION

In accordance with a first aspect of the invention, a joint for integrally rotatably connecting a rotating shaft to an output shaft of an electric motor comprises: a first transmission member integrally rotatably mounted on the output shaft; a second transmission member enclosing the first transmission member via a gap therebetween and providing integrally rotatable connection of the rotating shaft; and an elastic body interposed between the first transmission member and the second transmission member for transmission of the rotation of the first transmission member to the second transmission member.

The joint of this construction transmits the rotation of the output shaft of the electric motor to the rotating shaft via the elastic body interposed between the first and second transmission members. In this process, the elastic body is capable of accommodating or allowing for the eccentricity and inclination between the output shaft of the electric motor and the rotating shaft. This negates the need for establishing alignment between the output shaft of the electric motor and the rotating shaft so that the connection of these shafts is facilitated. If the rotating shaft vibrates, the elastic body damps the vibration thereby suppressing the noises. The joint has a simple construction and is designed to be reduced in the axial length thereof, requiring a smaller space for interconnection between the output shaft of the electric motor and the rotating shaft. Thus, the joint contributes to the reduction of size and costs of various apparatuses including the electric motor and rotating shaft.

It is preferred in the above joint that the first transmission member, second transmission member and elastic body comprise cylindrical bodies. In this case, the structure of the joint may be much more simplified.

The joint may have an arrangement wherein flat faces in opposed relation are formed at an outer periphery of the first transmission member and an inner periphery of the second transmission member. In this case, the relative rotation between the first and second transmission members is restrained by the flat faces. Therefore, the rotation of the electric motor can be easily and assuredly transmitted to the rotating shaft via the elastic body. Besides, the structure of the joint may be even more simplified. Where the rotating shaft is subjected to an excessive load, the flat faces of the transmission members receive the load thereby to protect the elastic body from the excessive load. Thus, the elastic body is prevented from being fractured by the excessive load, so that the joint is increased in durability and reliability.

The joint according to the first aspect of the invention may be used in a steering assist system for interconnecting an output shaft of an electric motor and a worm shaft, the steering assist system providing steering assist by transmitting the rotation of the electric motor to a steering shaft via the worm shaft, as the rotating shaft formed with a worm, and a worm wheel meshed with the worm of the worm shaft.

The steering assist system employing the joint according to the first aspect of the invention is adapted to transmit the rotation of the output shaft of the electric motor to the worm shaft via the elastic body interposed between the first and second transmission members. In this process, the elastic body is capable of accommodating or allowing for the eccentricity and inclination between the output shaft of the electric motor and the worm shaft. This negates the need for establishing alignment between the worm shaft and the output shaft of the electric motor, so that the interconnection of these shafts is facilitated. If the worm shaft vibrates, the elastic body damps the vibration so that the impairment of the steering feeling is prevented. Furthermore, the joint has a simple construction and is designed to be reduced in the axial length thereof, requiring a smaller space for interconnection between the output shaft of the electric motor and the worm shaft. Thus, the system can accomplish the reduction of size and costs.

In accordance with a second aspect of the invention, a joint for integrally rotatably connecting a rotating shaft to an output shaft of an electric motor comprises: a first transmission member integrally rotatably mounted on the output shaft; a second transmission member enclosing the first transmission member via a gap therebetween; an elastic body interposed between the first transmission member and the second transmission member for transmission of the rotation of the first transmission member to the second transmission member; a third transmission member providing integrally rotatable connection of the rotating shaft; and a torque limiter inhibiting relative rotation between the second transmission member and the third transmission member but permitting the relative rotation therebetween when the rotational resistance of the second transmission member or the third transmission member exceeds a predetermined value.

The joint according to the second aspect of the invention is adapted to transmit the rotation of the output shaft of the electric motor to the second transmission member via the first transmission member and the elastic body and then to transmit the rotation of the second transmission member to the rotating shaft via the torque limiter and the third transmission member. In this process, the elastic body is capable of accommodating or allowing for the eccentricity and inclination between the output shaft of the electric motor and the rotating shaft. This negates the need for establishing high precision alignment between the output shaft of the electric motor and the rotating shaft, so that the interconnection of these shafts is facilitated. If the rotating shaft vibrates, the elastic body damps the vibration thereby to suppress the noises. Furthermore, the torque limiter is adapted to permit the relative rotation between the second and third transmission members when the rotational resistance of the second or third transmission member exceeds the predetermined value. Hence, parts connected with the electric motor or the rotating shaft can be protected from damage in an event of an abnormal increase of the rotational resistance of either one of the output shaft and rotating shaft. The joint has a simple construction and is designed to be reduced in the axial length thereof, requiring a smaller space for interconnection of the output shaft of the electric motor and the rotating shaft. Thus, the joint contributes to the reduction of size and costs of various apparatuses including the electric motor and rotating shaft.

In the joint according to the second aspect of the invention, the torque limiter may include a lock member locked to either one of the second and third transmission members while slidably pressed against the other transmission member, and a spring for imparting frictional resistance to a contact surface between the latter transmission member and the lock member.

In this case, the spring imparts the frictional resistance to the contact surface between the latter transmission member and the lock member thereby effecting the transmission of the rotation of the second transmission member to the third transmission member via the lock member. If the rotational resistance of the second transmission member exceeds a predetermined value, the torque limiter is capable of permitting the relative rotation between the second and third transmission members by producing slippage between the lock member and the latter transmission member. Hence, the structure of the torque limiter may be extremely simplified. In addition, the torque limiter permits an arbitrary setting of torque transmission value which may be done by changing the biasing force of the spring.

In the joint according to the second aspect of the invention, the torque limiter may include a spring interposed between an end surface of the second transmission member and a spring seat formed at an end surface of the third transmission member in opposed relation with the end surface of the second transmission member for inhibiting the relative rotation between the second and third transmission members by way of frictional resistance at a contact surface between the spring and at least one of these transmission members.

In this case, the rotation of the second transmission member can be transmitted to the third transmission member by way of the frictional resistance at the contact surface between the spring and at least one of the second and third transmission members. Furthermore, the torque limiter is adapted to permit the relative rotation between the second and third transmission members by producing slippage at the aforesaid contact surface when the rotational resistance of the second transmission member exceeds the predetermined value. The structure of such a torque limiter may be extremely simplified.

In the joint according to the second aspect of the invention, the first transmission member, second transmission member, elastic body, and third transmission member may preferably comprise cylindrical bodies coaxially arranged with one another. In this case, the structure of the joint may be much more simplified.

The joint according to the second aspect of the invention may have an arrangement wherein flat faces in opposed relation are formed at an outer periphery of the first transmission member and an inner periphery of the second transmission member. In this case, the relative rotation between the first and second transmission members is restrained by the flat faces. Therefore, the rotation of the electric motor can be easily and assuredly transmitted to the second transmission member via the elastic body. Furthermore, the structure of the joint may be even more simplified. In addition, the flat faces receive the load applied to the elastic body by the operating torque limiter, thereby preventing the elastic body from being subjected to an excessive load. Thus is prevented the fracture of the elastic body due to the excessive load, so that the joint is increased in durability and reliability.

The joint according to the second aspect of the invention may be used in a steering assist system for interconnecting an output shaft of an electric motor and a worm shaft, the steering assist system providing steering assist by transmitting the rotation of the electric motor to a steering shaft via the worm shaft, as the rotating shaft formed with a worm, and a worm wheel meshed with the worm of the worm shaft.

The steering assist system employing the joint according to the second aspect of the invention is adapted to transmit the rotation of the output shaft of the electric motor to the worm shaft via the elastic body interposed between the first and second transmission members. In this process, the elastic body is capable of accommodating or allowing for the eccentricity and inclination between the output shaft of the electric motor and the worm shaft. This negates the need for establishing alignment between the output shaft of the electric motor and the worm shaft, so that the interconnection of these shafts is facilitated. If the worm shaft vibrates, the elastic body damps the vibration so that the impairment of the steering feeling is prevented. Furthermore, the joint has a simple construction and is designed to be reduced in the axial length thereof, requiring a smaller space for interconnection of the output shaft of the electric motor and the worm shaft. Hence, the system can accomplish the reduction of size and costs.

In the steering assist system employing the joint according to the first or second aspect of the invention, it is preferred that the worm shaft is supported in a manner to be biased toward the worm wheel and is biased toward the worm wheel by biasing means.

In this case, the worm shaft may be smoothly moved toward the worm wheel because the worm shaft is allowed to be biased toward the worm wheel and because the elastic body of the joint permits the eccentricity and inclination of the worm shaft relative to the output shaft of the electric motor. Hence, the worm is readily moved by the biasing means in a manner to follow the wear of the worm wheel, preventing the occurrence of backlash in an easy and positive manner.

DETAILED DESCRIPTION OF THE PREFERRED EMBODIMENT

The present invention will hereinbelow be described by way of reference to the accompanying drawings illustrating the preferred embodiments thereof.

Figure 3:
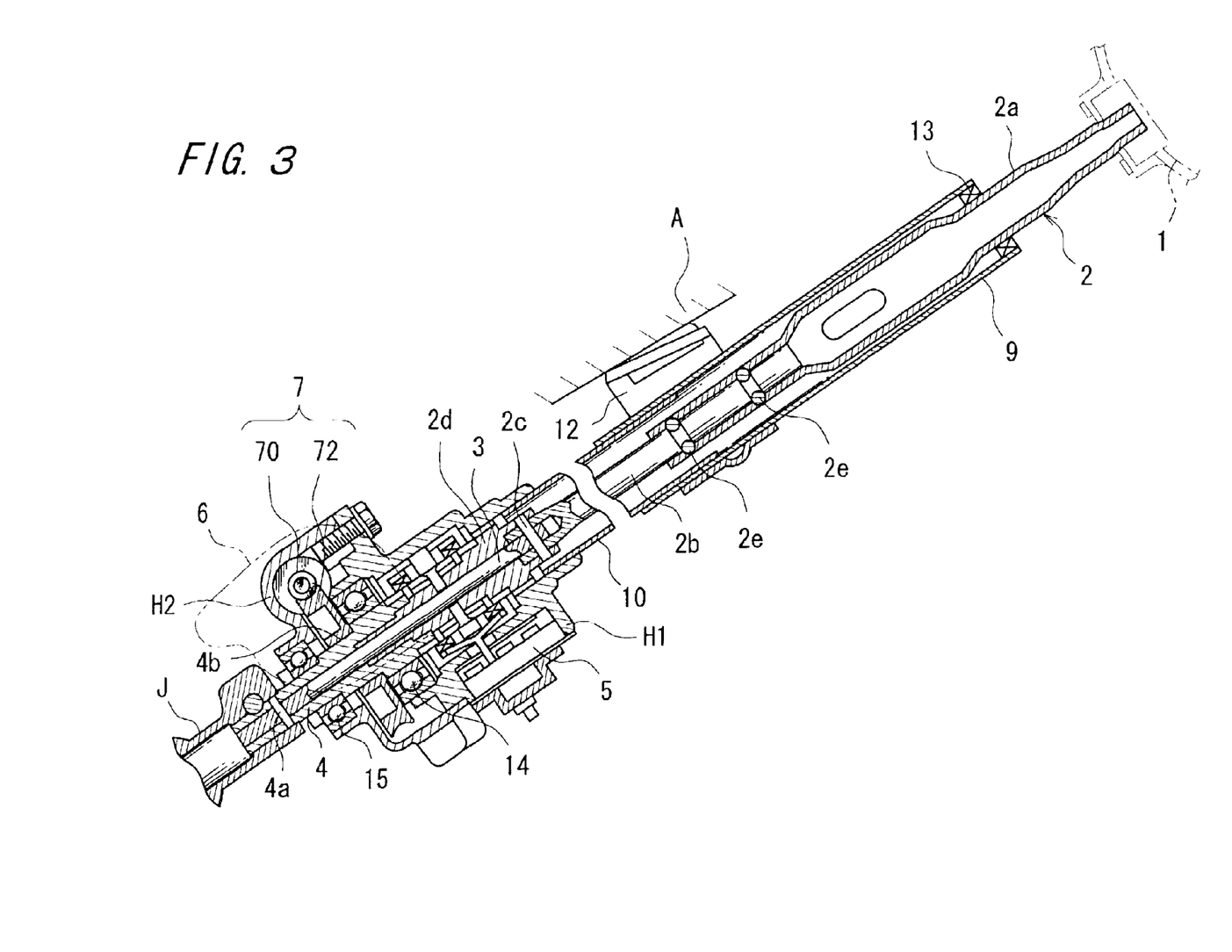
FIG. 3 is a sectional view showing a general construction of the steering assist system of the invention.

FIG. 3 is a sectional view showing one embodiment of the steering assist system of the invention. The steering assist system includes a first steering shaft 2 with a steering wheel 1 attached to its upper end, a cylindrical second steering shaft 4 connected to a lower end of the first steering shaft 2 via a torsion bar 3, a torque sensor 5 for detecting a steering torque based on a quantity of relative rotational displacement between the first steering shaft 2 and the second steering shaft 4, an electric motor 6 driven based on the detection results provided by the torque sensor 5, and a deceleration mechanism 7 decelerating the rotation of the electric motor 6 as transmitting the decelerated rotation thereof to the second steering shaft 4.

The first steering shaft 2 is supported by a first steering column 9 and a second steering column 10 as enclosed therein. The first steering column 9 is assembled to a vehicle body A via a bracket 12. The torque sensor 5 is housed in a sensor housing H1, whereas the deceleration mechanism 7 is housed in a gear housing H2. The electric motor 6 is fixed to the gear housing H2.

The first steering shaft 2 includes a cylindrical first shaft body 2a with the steering wheel 1 attached to its upper end, a bar-like second shaft body 2b fitted in a lower end of the first shaft body 2a for integral rotation therewith as allowed to move axially, and a cylindrical third shaft body 2d connected with the second shaft body 2b by means of a pin 2c. The first shaft body 2a has a mid-portion thereof rotatably carried by the cylindrical first steering column 9 via a bearing 13. A shock absorbing member 2e formed of a synthetic resin material is interposed between the first and second shaft bodies 2a, 2b for absorbing impact energy applied to the steering wheel 1 by the vehicle operator at collision of the vehicle or the like. The torque sensor 5 is interposed between the third shaft body 2d and the second steering shaft 4.

The second steering column 10 has its upper end slidably fitted in the first steering column 9 and its lower end fitted in the sensor housing H1 such that the first steering column 9 may be axially moved relative to the second steering column 10 for absorption of the impact energy.

The torsion bar 3 is introduced in the second steering shaft 4, a lower end of which is coupled with the torsion bar 3 via a pin 4a for integral rotation therewith. The second steering shaft 4 has its axial mid-portion rotatably carried by the gear housing H2 via a pair of bearings 14, 15, whereas an inside circumference of a worm wheel 72 is fitted with a central portion 4b between the bearings 14, 15 for integral rotation therewith.

Figure 1:
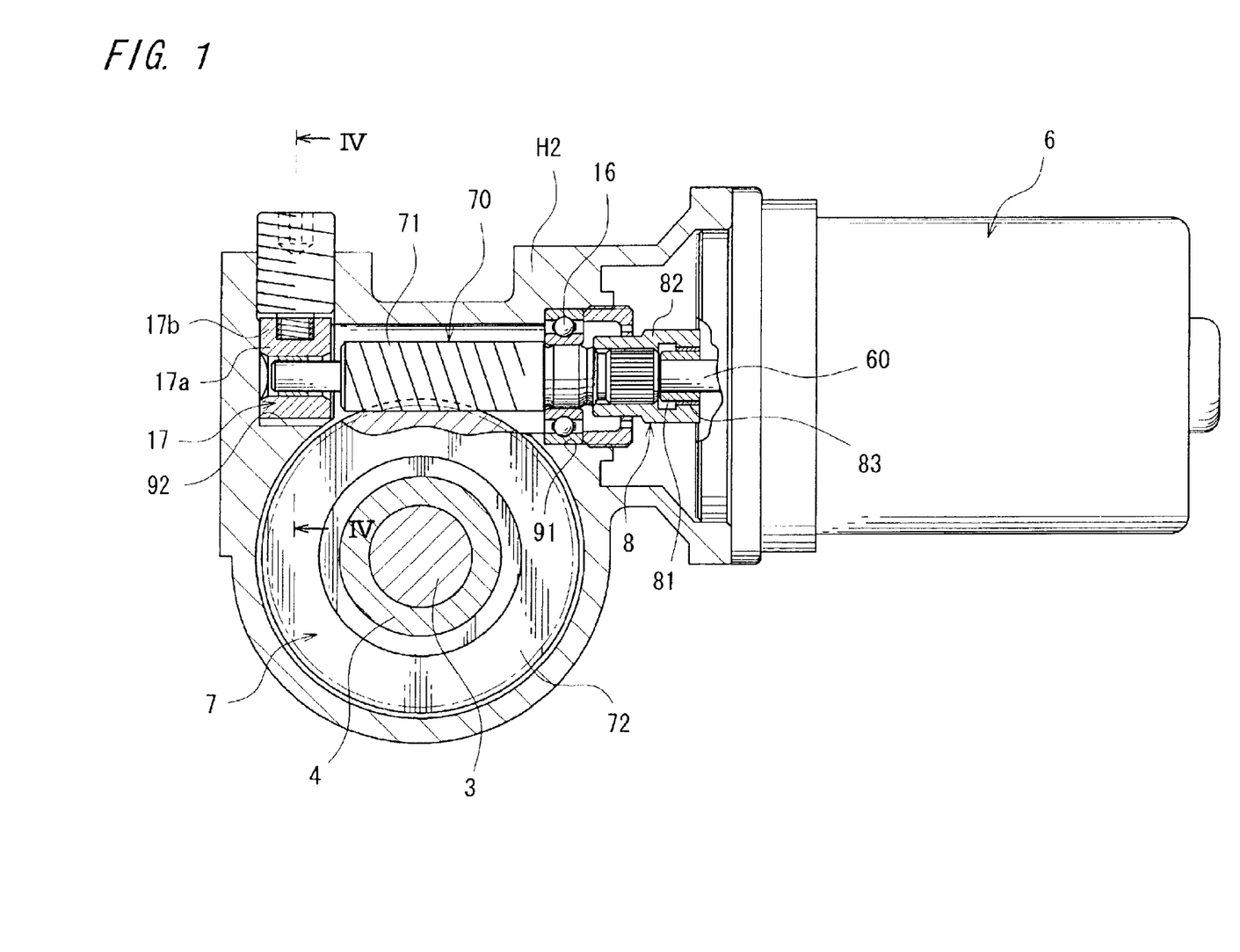
FIG. 1 is a sectional view showing an electric motor and a deceleration mechanism of a steering assist system according to one embodiment of the invention.

As shown in FIG. 1, the deceleration mechanism 7 includes a worm shaft 70 connected with an output shaft 60 of the electric motor 6 via a joint 8, and the worm wheel 72 integrally rotatably fitted with the second steering shaft 4. The worm shaft 70 is integrally formed with a worm 71 on an axial mid-portion thereof, the worm 71 meshed with the worm wheel 72. Therefore, the rotation of the output shaft 60 of the electric motor 6 can be transmitted to the second steering shaft 4 as decelerated by the worm shaft 70 and the worm wheel 72. The rotation of the second steering shaft 4 is transmitted to, for example, a rack and pinion steering mechanism via a universal joint J (see FIG. 3), the rack and pinion steering mechanism being coupled with road wheels.

Figure 2:
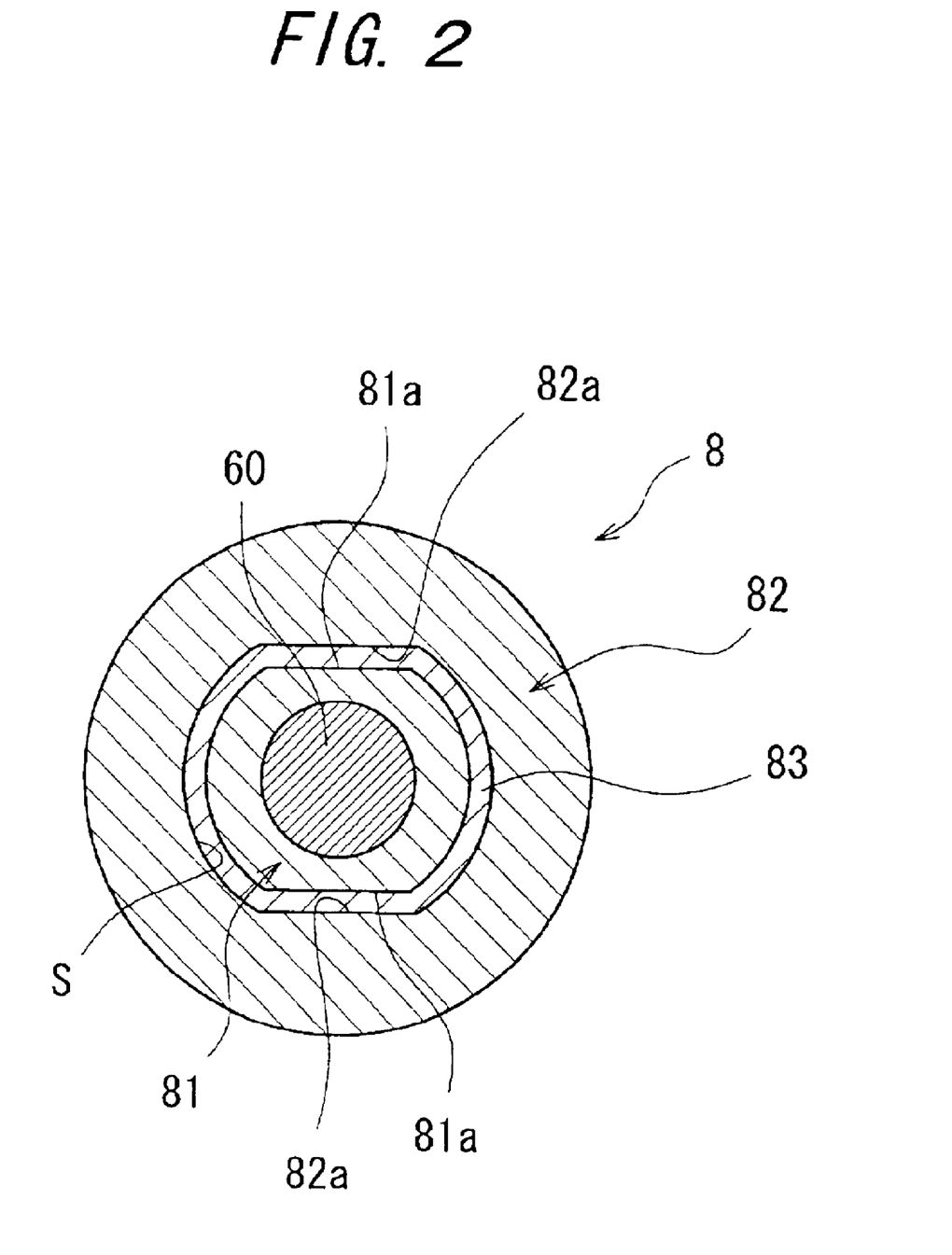
FIG. 2 is a sectional view showing a joint.

The joint 8 for interconnection between the output shaft 60 of the electric motor 6 and the worm shaft 70 includes, as shown in FIGS. 1 and 2, a first transmission member 81 mounted to the output shaft 60, a second transmission member 82 with the worm shaft 70 mounted thereto, and a cylindrical elastic body 83 interposed between the first transmission member 81 and the second transmission member 82.

The first transmission member 81 consists of a short cylindrical body, an inner periphery of which is press-fitted on an outer periphery of the output shaft 60 such that the first transmission member may be rotated in unison with the output shaft. The first transmission member 81 is formed with parallel flat faces 81a at opposite places of an outer periphery thereof.

The second transmission member 82 is formed of a cylindrical body having greater diameter and longitudinal length than the first transmission member 81. The second transmission member is disposed coaxially with the first transmission member 81, an upper part of an inner periphery of the second transmission member enclosing the outer periphery of the first transmission member 81 via a gap S defined therebetween. The worm shaft 70 has its right end, as seen in FIG. 1, fitted in a left end of the inner periphery of the second transmission member 82. A relative rotation between the worm shaft and the second transmission member is restrained by rotation inhibition means such as serration. The second transmission member 82 is formed with parallel flat faces 82a at opposite places of the inner periphery thereof, the flat faces 82a opposing the flat faces 81a, respectively. Thus, the flat faces 81a, 82a restrain the transmission members 81, 82 from relatively rotating to each other through a given angle or more.

The elastic body 83 consists of a cylindrical body formed of rubber or synthetic resin material. The elastic body 83 is inserted in the gap S with its inner periphery in intimate contact with the outer periphery of the first transmission member 81 and with its outer periphery in intimate contact with a right end of the inner periphery of the second transmission member 82.

The joint 8 of the above construction permits the rotation of the output shaft 60 of the electric motor 6 to be transmitted to the second transmission member 82 via the first transmission member 81 and the elastic body 83, and then to the worm shaft 70 via the second transmission member 82. In this process, the elastic body 83 is capable of accommodating or allowing for the eccentricity and inclination between the output shaft 60 and the worm shaft 70. This negates the need for particularly increasing connection precisions for the worm shaft 70 and the output shaft 60, so that the interconnection of these shafts is facilitated. Furthermore, the elastic body 83 also accommodates the rotational vibration of the worm shaft 70 thereby preventing the vibration from being transmitted to the steering wheel 1 to impair the steering feeling. In addition, the joint has a simple construction and achieves a notable reduction of the overall length thereof by virtue of the cylindrical first transmission member 81, second transmission member 82 and elastic body 83 coaxially arranged. Thus, the joint contributes to the size reduction of the deceleration mechanism 7.

The joint 8 is adapted to transmit the rotation of the output shaft 60 by means of the flat faces 81a, 82a of the first transmission member 81 and second transmission member 82 so that the construction thereof may be even further simplified. When an excessive load is applied to the worm shaft 70, the flat faces 81a, 82a of the transmission members 81, 82 receive the load, thereby protecting the elastic body 83 from the excessive load. This is effective to prevent a fracture of the elastic body 83 due to the excessive load, so that the joint 8 is increased in durability and reliability.

The worm shaft 70 is disposed in a manner to intersect an axis of the second steering shaft 4 at right angle and has its axially opposite ends rotatably supported by first and second bearing holes 91, 92 of the gear housing H2 via first and second bearings 16, 17. The first bearing 16 disposed at a distal end (on a side closer to the electric motor 6) of the worm shaft 70 consists of a ball bearing, whereas the second bearing 17 disposed at a distal end thereof consists of a metal bearing.

Figure 4:
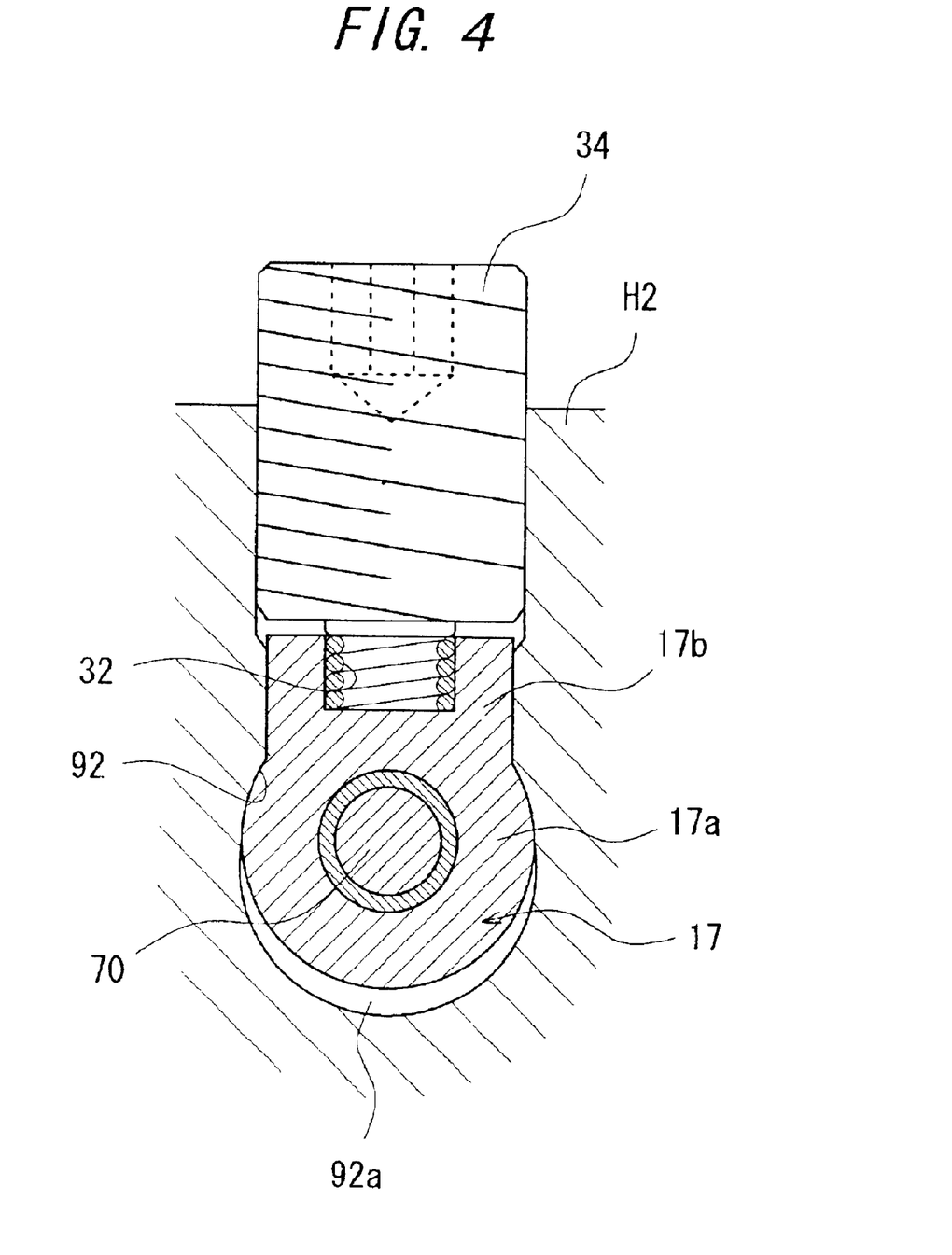
FIG. 4 is a sectional view taken on the line IV—IV in FIG. 1.

The second bearing 17 at the distal end of the worm shaft 70 is mounted in the second bearing hole 92 in a manner to be biased toward the worm wheel 72. More specifically, a clearance 92a is provided between the deepest portion of the second bearing hole 92 and the second bearing 17, as shown in FIG. 4, such that the second bearing 17 is allowed to move for the clearance 92a toward the worm wheel 72.

A plug 34 is threaded in an opening of the second bearing hole 92. A helical compression spring 32, as means for constantly biasing the second bearing 17 toward the worm wheel 72, is interposed between the plug 34 and the second bearing 17 in a resiliently contracted fashion. In the figure, the helical compression spring 32 is accommodated in a bottomed cylindrical projection 17b projecting from an outer periphery of an outer race 17a of the second bearing 17. The biasing force of the helical compression spring 32 is set to an optimum value by adjusting the treading of the plug 34 into the second bearing hole 92.

The above arrangement permits the worm shaft 70 to pivotally incline about the joint 8 toward the worm wheel 72. Hence, the biasing force of the helical compression spring 32 can keep the worm 71 of the worm shaft 70 resiliently pressed against the worm wheel 72. Therefore, if the tooth flanks of the worm 71 and the worm wheel 72 wear away from long-term use, the worm 71 is adapted to follow the wearing of the flanks for preventing the occurrence of backlash. Particularly in this embodiment, the elastic body 83 of the joint 8 serves to accommodate the eccentricity and inclination of the worm shaft 70 relative to the output shaft 60 of the electric motor 6. Hence, the worm shaft 70 may be smoothly moved toward the worm wheel 72 by the biasing force of the helical compression spring 32 while on the other hand, the worm shaft 70 may be moved away from the worm wheel 72 to avoid the increase in the rotational torque if the synthetic-resin worm wheel 72 expands due to water absorption or heat. The aforesaid movement of the worm shaft 70 involves the eccentricity and inclination thereof relative to the output shaft 60, thus resulting in increased vibration of the worm shaft 70. However, the vibration can be effectively damped by the elastic body 83.

Since the worm 71 of the worm shaft 70 can be resiliently pressed against the worm wheel 72 as described above, the assembly of the worm shaft and the worm wheel provides for such an adjustment of backlash as is not affected by dimensional errors of parts including these components.

Although the worm shaft 70 is constrained by the bearings 16, 17, radial clearances in the bearings 16, 17 as well as clearance between each of the bearings 16, 17 and the worm shaft 70 eliminate interference with the inclination of the worm shaft 70.

Figure 5:
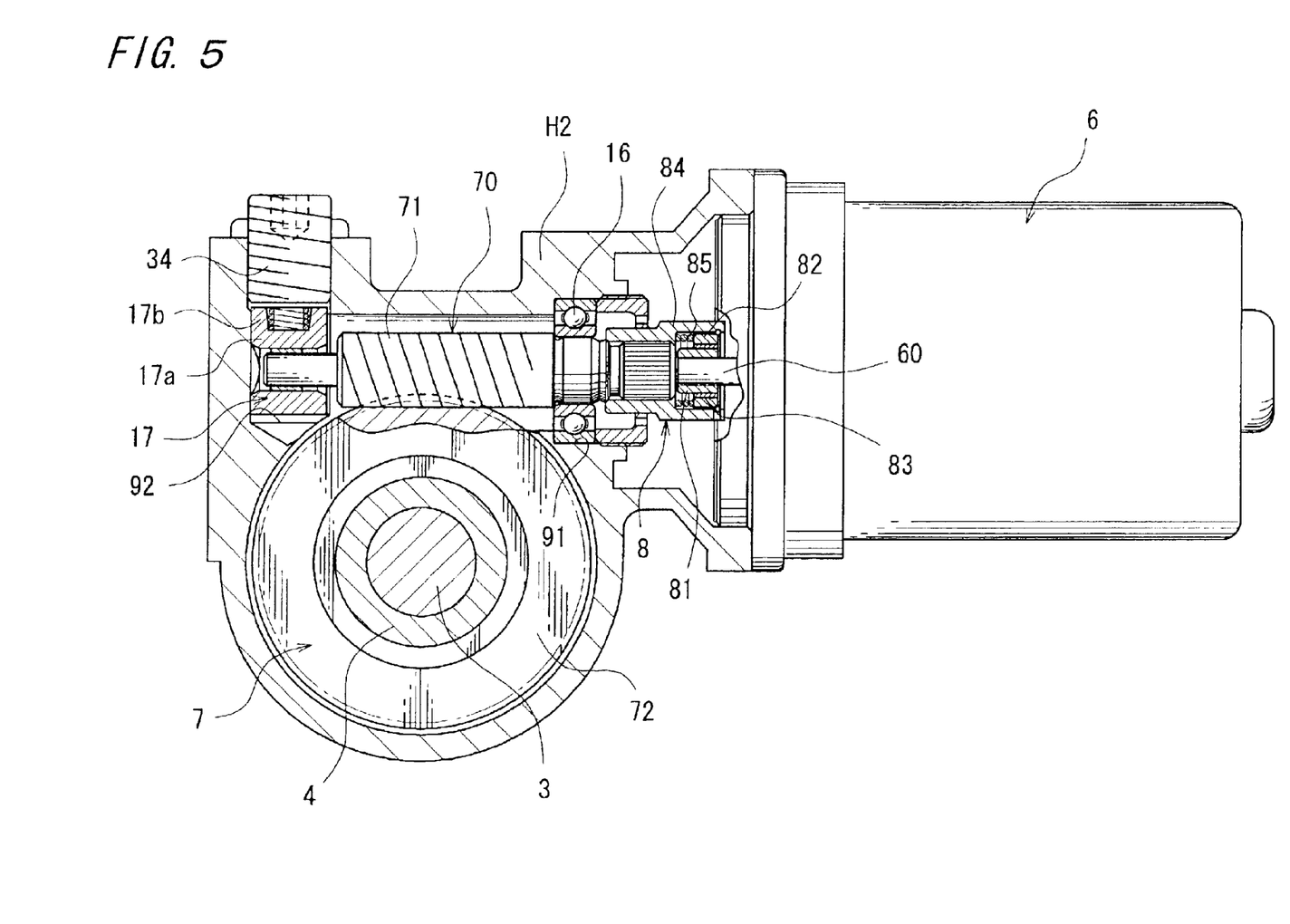
FIG. 5 is a sectional view showing an electric motor and deceleration mechanism of a steering assist system according to another embodiment of the invention.

FIG. 5 is a sectional view showing a deceleration mechanism 7 of an steering assist system according to another embodiment. This steering assist system and that of FIG. 1 are constructed the same way except for the construction of the joint 8.

Figure 6:
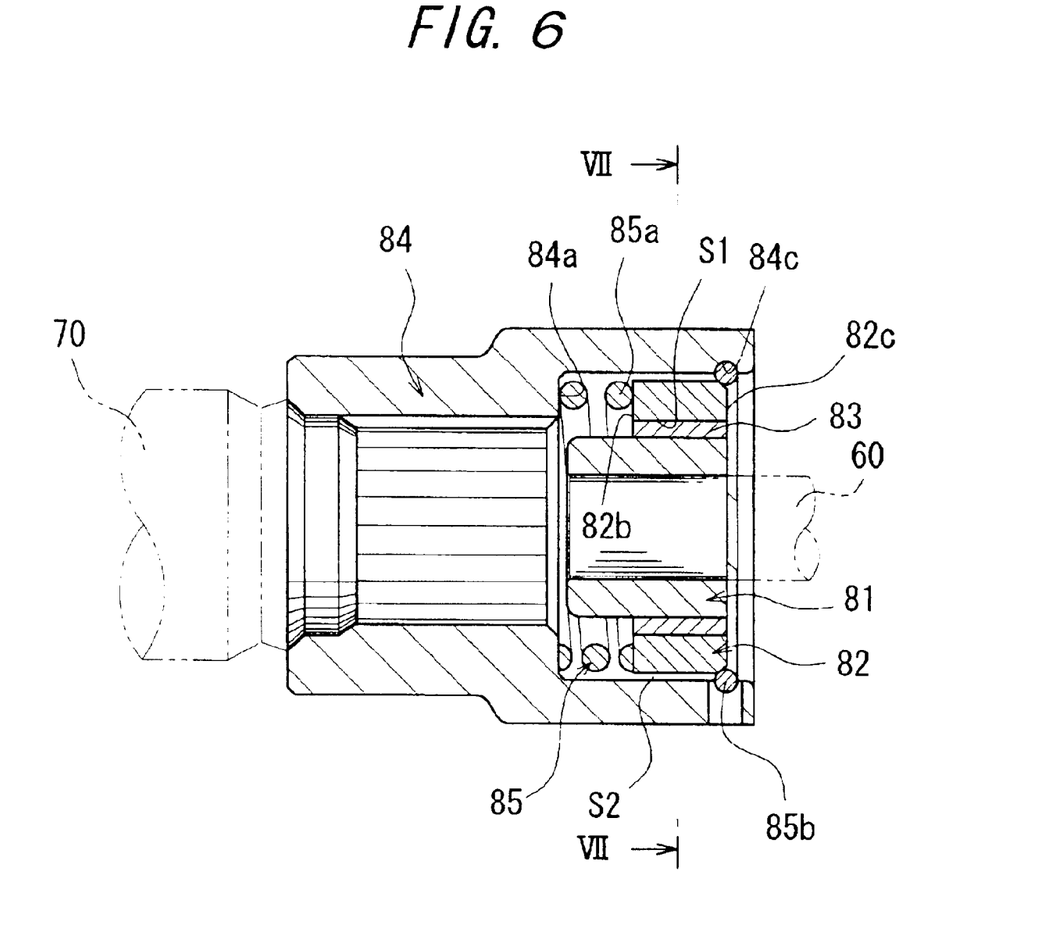
FIG. 6 is a sectional view showing a joint.

As shown in FIG. 6, the joint 8 of this embodiment includes the first transmission member 81 mounted to the output shaft 60, the second transmission member 82 enclosing the first transmission member 81 via a gap therebetween, a third transmission member 84 with the worm shaft 70 mounted thereto, the cylindrical elastic body 83 interposed between the first transmission member 81 and the second transmission member 82, and a torque limiter 85 disposed at a space between the first transmission member 81 and the third transmission member 84.

The first transmission member 81 consists of a short cylindrical body, an inner periphery of which is press-fitted on an outer periphery of the output shaft 60 such that the first transmission member may be rotated in unison with the output shaft. The first transmission member 81 is formed with the parallel flat faces 81a at opposite places of the outer periphery thereof (see FIG. 7).

Figure 7:
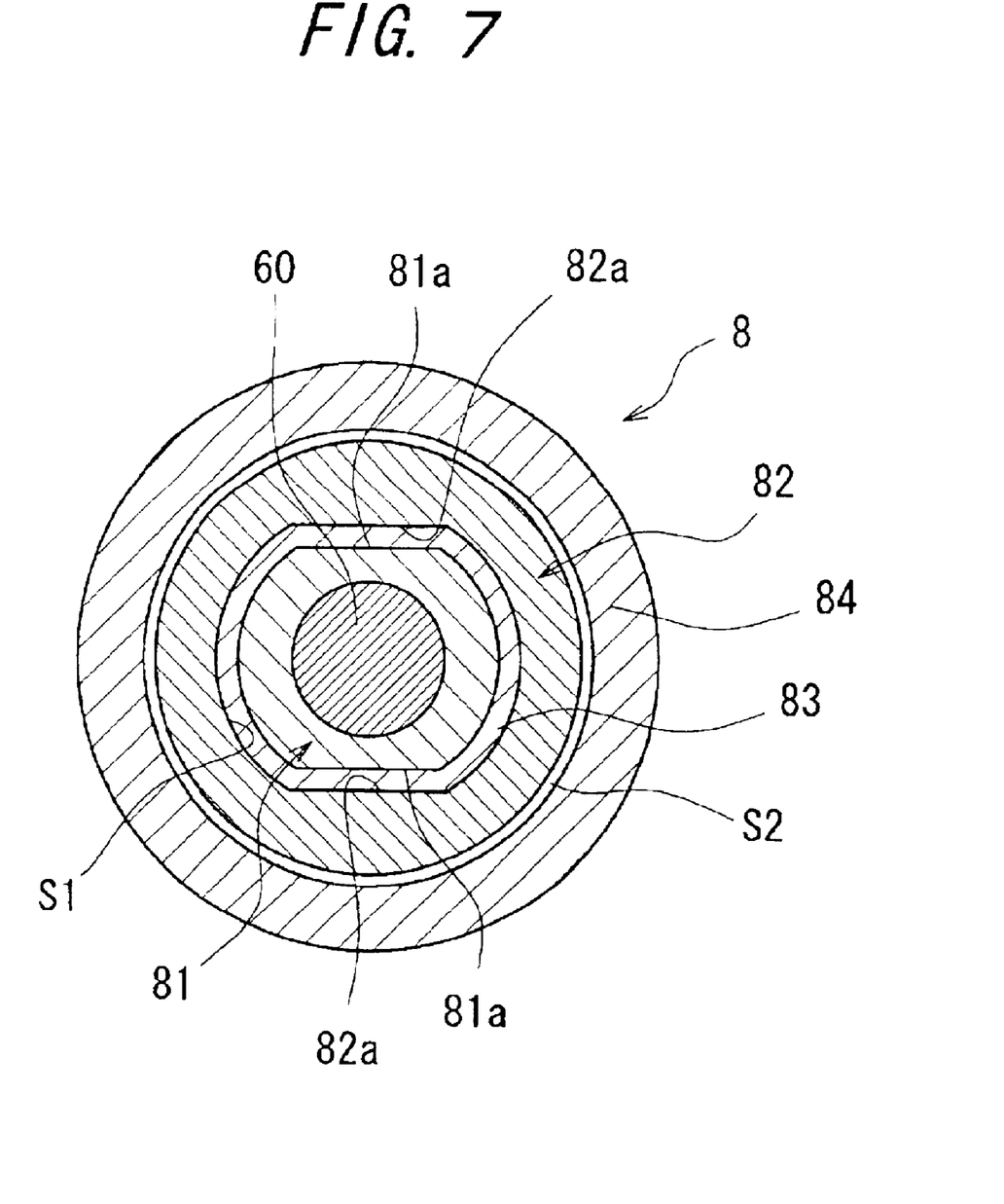
FIG. 7 is a sectional view taken on the line VII—VII in FIG. 6.

The second transmission member 82 consists of a cylindrical body having greater diameter and longitudinal length than the first transmission member 81. The second transmission member is disposed coaxially with the first transmission member 81, as enclosing the outer periphery of the first transmission member 81 via a gap S1 defined therebetween. The second transmission member 82 is formed with parallel flat faces 82a at opposite places of the inner periphery thereof, the flat faces 82a opposing the flat faces 81a, respectively. Thus, the flat faces 81a, 82a restrain the transmission members 81, 82 from relatively rotating to each other through a given angle or more.

The third transmission member 84 consists of a cylindrical body having greater diameter and longitudinal length than the second transmission member 82. The third transmission member is disposed coaxially with the second transmission member 82, as enclosing the outer periphery of the second transmission member 82 via a gap S2 defined therebetween. The worm shaft 70 has its right end, as seen in FIG. 5, fitted in a left end of an inner periphery of the third transmission member 84. A relative rotation between the worm shaft and the third transmission member is inhibited by rotation inhibition means such as serration. The third transmission member 84 is formed with a step on its inside surface, an end surface of which step is in face-to-face relation with an end surface of the second transmission member 82 and defines a spring seat 84a.

The elastic body 83 is a cylindrical body formed of rubber or synthetic resin material. The elastic body is inserted in the gap S1 with its inner periphery bonded to the outer periphery of the first transmission member 81 and with its outer periphery bonded to the inner periphery of the second transmission member 82.

The torque limiter 85 includes a spring 85a interposed between one end surface 82b of the second transmission member 82 and the spring seat 84a, and a circlip 85b as a lock member locked to the third transmission member 84. The spring 85a consists of a helical compression spring interposed between the end surface 82b and the spring seat 84a as resiliently contracted by a given amount. The circlip 85b has its outer circumference fitted in an annular groove 84c formed in an inner periphery of the third transmission member 84 at its end closer to the electric motor 6 as restrained in the circumferential movement thereof, and has its inner circumference slidably pressed against an outer peripheral corner of the other end surface 82c of the second transmission member 82. This arrangement prevents the drop-off of the second transmission member 82 and applies a frictional resistance to a contact surface between the circlip 85b and the second transmission member 82 according to the biasing force of the spring 85a.

The torque limiter 85 transmits the rotation of the second transmission member 82 to the third transmission member 84 by way of the frictional resistance at the contact surface between the second transmission member 82 and the circlip 85b. The rotational torque transmitted to the third transmission member 84 has a sufficiently great value for providing a required steering assist. If, on the other hand, the rotational resistance of the second transmission member 82 or the third transmission member 84 exceeds a predetermined value due to a failure of the electric motor 6 or a rotation failure of the worm shaft 70, slippage is produced at the contact surface between the second transmission member 82 and the circlip 85b thereby permitting relative rotation between the second transmission member 82 and the third transmission member 84. The torque limiter 85 permits an arbitrary setting of torque transmission value which may be done simply by changing the biasing force of the spring 85a.

The joint 8 of the above construction is adapted to transmit the rotation of the output shaft 60 of the electric motor 6 to the second transmission member 82 via the first transmission member 81 and the elastic body 83 and then to transmit the rotation of the second transmission member 82 to the worm shaft 70 via the torque limiter 85 and the third transmission member 84. In this process, the eccentricity and inclination between the output shaft 60 and the worm shaft 70 may be accommodated or allowed by the elastic body 83. This negates the need for particularly increasing connection precisions for the worm shaft 70 and the output shaft 60, so that the interconnection of these shafts is facilitated. Furthermore, the elastic body 83 also accommodates the rotational vibration of the worm shaft 70 thereby preventing the vibration from being transmitted to the steering wheel 1 to impair the steering feeling. In addition, the torque limiter 85 permits the rotation of the third transmission member 84 and the worm shaft 70 in the event of an abnormal increase of the rotational resistance of the output shaft 60 due to the failure of the electric motor 6. This eliminates the need for abnormally increased steering effort on the steering wheel 1. Furthermore, the joint has a simple construction and achieves a notable reduction of the overall length thereof by virtue of the cylindrical first transmission member 81, second transmission member 82, elastic body 83 and third transmission member 84 arranged coaxially with one another. Thus, the joint contributes to the size reduction of the deceleration mechanism 7.

The joint 8 is adapted to transmit the rotation of the output shaft 60 by means of the flat faces 81a, 82a of the first transmission member 81 and second transmission member 82, so that the construction thereof may be even further simplified. When the rotational resistance of the second transmission member 82 or the third transmission member 84 exceeds the predetermined value to bring the torque limiter 85 into operation, the flat faces 81a, 82a of the transmission members 81, 82 receive the load, thereby protecting the elastic body 83 from the excessive load. This is effective to prevent a fracture of the elastic body 83 due to the excessive load, leading to increased durability and reliability of the joint 8.

The torque limiter 85 may have an arrangement wherein the circlip 85b has its inner circumference locked to the second transmission member 82 and its outer circumference slidably pressed against the third transmission member 84. In this case, the relative rotation between the circlip 85b and the third transmission member 84 is restrained by the frictional resistance at the contact surface therebetween.

The torque limiter 85 may have an alternative arrangement wherein the circlip 85b functions only to prevent the drop-off of the second transmission member 82 while the rotation of the second transmission member 82 is transmitted to the third transmission member 84 by way of the frictional resistance at the contact surface between one end of the spring 85a and the end surface 82b of the second transmission member 82 and the frictional resistance at the contact surface between the other end of the spring 85a and the spring seat 84a of the third transmission member 84. In this case, the relative rotation between the second transmission member 82 and the third transmission member 84 may be permitted by at least producing slippage at either one of the contact surfaces between the spring 85a and the end surface 82b of the second transmission member 82 and between the spring 85a and the spring seat 84a of the third transmission member 84. Furthermore, the torque limiter 85 may also be arranged such that the spring 85a is locked to the second transmission member 82 or the third transmission member 84 at one end of its coiled wire, thereby preventing the production of friction on the locked side. In short, the torque limiter 85 may have any arrangement that utilizes the frictional resistance at the contact surface at least between the spring 85a and either one of the second transmission member 82 and the third transmission member 84 for inhibiting the relative rotation between the transmission members.

Furthermore, the torque limiter 85 may employ a screw having wear resistance in the place of the circlip 85b, the screw penetrating the third transmission member 84 as threaded therein and slidably contacting the second transmission member 82 at its distal end. In this arrangement, the torque limiter 85 permits an arbitrary setting of torque transmission value which may be done by adjusting the amount of treading of the screw.

It is noted that the inventive steering assist system is not limited to the foregoing embodiments and various changes and modifications may be made to the design thereof. For instance, peripheral surfaces of the transmission members 81, 82, which are in opposed relation, may have hexagonal shapes in section.

The foregoing joint 8 may preferably be used not only for the interconnection between the output shaft 60 of the electric motor 6 and the worm shaft 70 but also for the interconnection between the output shaft 60 and any one of the variety of rotating shafts driven into rotation by the output shaft 60.

What is claimed is:

1. A joint for integrally rotatably connecting a rotating shaft to an output shaft of an electric motor comprising:
   a cylindrical first transmission member integrally rotatably mounted on the output shaft;
   a cylindrical second transmission member enclosing the cylindrical first transmission member via a gap therebetween;
   a cylindrical elastic body interposed between the cylindrical first transmission member and the cylindrical second transmission member for transmission of the rotation of the cylindrical first transmission member to the cylindrical second transmission member;
   a cylindrical third transmission member providing integrally rotatable connection of the rotating shaft; and
   a torque limiter inhibiting relative rotation between the cylindrical second transmission member and the cylindrical third transmission member but permitting the relative rotation therebetween when the rotational resistance of the cylindrical second transmission member or the cylindrical third transmission member exceeds a predetermined value; and
   flat faces formed at an outer periphery of the cylindrical first transmission member and an inner periphery of the cylindrical second transmission member so as to be in opposed relation with each other and to restrain the cylindrical first transmission member and the cylindrical second transmission member from relatively rotating with respect to each other through a given angle or more.

2. The joint as claimed in claim 1, wherein the torque limiter includes a lock member locked to either one of the second and third transmission members while slidably pressed against the other transmission member, and a spring for imparting frictional resistance to a contact surface between the latter transmission member and the lock member.

3. The joint as claimed in claim 1, wherein the torque limiter includes a spring interposed between an end surface of the second transmission member and a spring seat formed at an end surface of the third transmission member in opposed relation with the end surface of the second transmission member for inhibiting the relative rotation between the second and third transmission members by way of frictional resistance at a contact surface between the spring and at least either one of these transmission members.

4. A steering assist system for providing steering assist by transmitting the rotation of an electric motor to a steering shaft via a worm shaft, as a rotating shaft formed with a worm, and a worm wheel meshed with the worm of the worm shaft,
   wherein an output shaft of the electric motor and the worm shaft are interconnected by way of a joint comprising:
   a cylindrical first transmission member integrally rotatably mounted on the output shaft;
   a cylindrical second transmission member enclosing the cylindrical first transmission member via a gap therebetween;
   a cylindrical elastic body interposed between the cylindrical first transmission member and the cylindrical second transmission member for transmission of the rotation of the cylindrical first transmission member to the cylindrical second transmission member;
   a cylindrical third transmission member providing integrally rotatable connection of the rotating shaft; and
   a torque limiter inhibiting relative rotation between the cylindrical second transmission member and the cylindrical third transmission member but permitting the relative rotation therebetween when the rotational resistance of the cylindrical second transmission member or the cylindrical third transmission member exceeds a predetermined value; and
   flat faces formed at an outer periphery of the cylindrical first transmission member and an inner periphery of the cylindrical second transmission member so as to be in opposed relation with each other and to restrain the cylindrical first transmission member and the cylindrical second transmission member from relatively rotating with respect to each other through a given angle or more.

5. A steering assist system for providing steering assist by transmitting the rotation of an electric motor to a steering shaft via a worm shaft, as a rotating shaft formed with a worm, and a worm wheel meshed with the worm of the worm shaft, wherein an output shaft of the electric motor and the worm shaft are interconnected by way of a joint comprising:

a cylindrical first transmission member integrally rotatably mounted on the output shaft;

a cylindrical second transmission member enclosing the cylindrical first transmission member via a gap therebetween;

a cylindrical elastic body interposed between the cylindrical first transmission member and the cylindrical second transmission member for transmission of the rotation of the cylindrical first transmission member to the cylindrical second transmission member;

a cylindrical third transmission member providing integrally rotatable connection of the rotating shaft; and a torque limiter inhibiting relative rotation between the cylindrical second transmission member and the cylindrical third transmission member but permitting the relative rotation therebetween when the rotational resistance of the cylindrical second transmission member or the cylindrical third transmission member exceeds a predetermined value; said torque limiter including a lock member locked to either one of the second and third transmission members while slidably pressed against the other transmission member, and a spring for imparting frictional resistance to a contact surface between the latter transmission member and the lock member; and flat faces formed at an outer periphery of the cylindrical first transmission member and an inner periphery of the cylindrical second transmission member so as to be in opposed relation with each other and to restrain the cylindrical first transmission member and the cylindrical second transmission member from relatively rotating with respect to each other through a given angle or more.

6. A steering assist system for providing steering assist by transmitting the rotation of an electric motor to a steering shaft via a worm shaft, as a rotating shaft formed with a worm, and a worm wheel meshed with the worm of the worm shaft, wherein an output shaft of the electric motor and the worm shaft are interconnected by way of a joint comprising:

a cylindrical first transmission member integrally rotatably mounted on the output shaft;

a cylindrical second transmission member enclosing the cylindrical first transmission member via a gap therebetween;

a cylindrical elastic body interposed between the cylindrical first transmission member and the cylindrical second transmission member for transmission of the rotation of the cylindrical first transmission member to the cylindrical second transmission member;

a cylindrical third transmission member providing integrally rotatable connection of the rotating shaft; and a torque limiter inhibiting relative rotation between the cylindrical second transmission member and the cylindrical third transmission member but permitting the relative rotation therebetween when the rotational resistance of the cylindrical second transmission member or the cylindrical third transmission member exceeds a predetermined value; wherein the torque limiter includes a spring interposed between an end surface of the second transmission member and a spring seat formed at an end surface of the third transmission member in opposed relation with the end surface of the second transmission member for inhibiting the relative rotation between the second and third transmission members by way of frictional resistance at a contact surface between the spring and at least either one of these transmission members, and flat faces formed at an outer periphery of the cylindrical first transmission member and an inner periphery of the cylindrical second transmission member so as to be in opposed relation with each other and to restrain the cylindrical first transmission member and the cylindrical second transmission member from relatively rotating with respect to each other through a given angle or more.

* * * * *